(12) United States Patent
Sheldon (10) Patent No.: US 6,899,427 B1
(45) Date of Patent: May 31, 2005

(54) LENS ATTACHMENT COMBINED WITH FORMATION OF EYE GLASSES FRAME

(76) Inventor: Brent Sheldon, 72 Sherbrooke Street West, Apt. 3, Montreal, Quebec (CA), H2X 1X3

( * ) Notice: Subject to any disclaimer, the term of this patent is extended or adjusted under 35 U.S.C. 154(b) by 0 days.

(21) Appl. No.: 10/781,660

(22) Filed: Feb. 20, 2004

(51) Int. Cl.[7] ............................. G02C 13/00; G02C 1/00
(52) U.S. Cl. ........................... 351/178; 351/83; 351/86; 351/154
(58) Field of Search ......................... 351/41, 83–86, 351/154, 178

(56) References Cited

U.S. PATENT DOCUMENTS 4,196,982 A * 4/1980 Watkins ..................... 351/86
5,331,355 A * 7/1994 Frank et al. ................ 351/41
6,676,257 B2   1/2004 Sheldon et al. ............ 351/49
6,692,124 B2   2/2004 Katz et al. .................. 351/62

* cited by examiner

Primary Examiner—Huy Mai
(74) Attorney, Agent, or Firm—Ogilvy Renault; Wayne H. Yan (57) ABSTRACT

The present invention provides a method and structural arrangement for permanently attaching lenses to a pair of eye glasses which include a frame structure made of substantially rigid plastic material. The attachment of the lenses to the frame structures of eye glasses is achieved during the formation of the frame structures. A variety of engaging structures between the lenses and a frame body can be formed together with the formation of frame structure in a plastic formation molding procedure.

15 Claims, 8 Drawing Sheets

LENS ATTACHMENT COMBINED WITH FORMATION OF EYE GLASSES FRAME

FIELD OF THE INVENTION

The present invention relates to eyewear, and more particularly to a method and a structural arrangement for attaching lenses to frames of eye glasses.

BACKGROUND OF THE INVENTION

The structural features of conventional eyewear are generally catalogued into two groups. The first group includes goggles, the frames of which usually include a portion contoured in accordance with and abutting the user's face around the eyes, and are retained on the user's head by an elastic strip. Therefore, semi-flexible plastic materials are conventionally used for the frames of goggles in order to provide proper flexibility and resiliency which are also advantageous for attachment of lenses to thee frames of the goggles. Goggles are used in special circumstances such as during swimming, skiing, or other sports rather than for everyday life.

The second group of eyewear includes a variety of eye glasses which are all characterized as having a substantially rigid frame with a pair of temples for retaining the eye glasses on the user's head. Metal or substantially rigid plastic materials are conventionally used for the frames of eye glasses, and the latter is more widely and typically used, for example, for sunglasses.

Nevertheless, there has been a problem of securely attaching lenses to eye glasses frames, and more particularly to the substantially rigid plastic frames of eye glasses. The plastic frames of eye glasses typically define a pair of apertures for receiving a pair of lenses therein, respectively. Such lenses are usually made of glass or rigid transparent plastics, which have limited resiliency properties. Conventionally, the lenses are attached to the respective apertures of the frame of a pair of eye glasses using a "click in" action which forces elastic deformation of either or both the lenses and a portion of the frame body defining the respective apertures when each lens is pressed into one of the apertures. However, neither the rigid lens nor the portion of the rigid frame body defining the aperture provides a significant elastic deformation during the "click in" action for a more secure attachment of the lens to the frame. Eye glasses users unfortunately sometimes suffer the loss of lenses from their eye glasses because the lenses have become less firmly retained within the apertures of the frame over a period of usage. It should be noted that the conventional "click in" type of attachment of lenses to the apertures of the eye glasses frames requires very accurate geometry of both the peripheries of lenses and the apertures of the frames, when the lenses and frames are fabricated in separate manufacturing processes.

Therefore, there is a need for a secure attachment of lenses to the apertures of frames of eye glasses, particularly to the apertures of substantially rigid plastic frames of eye glasses.

SUMMARY OF THE INVENTION

One object of the present invention is to provide a method and a structural arrangement for attaching a substantially rigid lens to a substantially rigid plastic frame of a pair of eye glasses.

In accordance with one aspect of the present invention, there is a method provided for attaching a substantially rigid lens to a substantially rigid eye glasses frame which comprises steps of providing a molding device for molding the substantially rigid plastic eye glasses frame; placing the lens in a predetermined position with respect to the molding device, in the predetermined position a portion of the molding device overlapping a portion of the lens; and forming the substantially rigid eye glasses frame with permanent engagement of the lens thereto using the molding device.

In accordance with another aspect of the present invention there is a structural arrangement for attaching a substantially rigid lens to an aperture of a frame of a pair of eye glasses which comprises a frame body made of a substantially rigid plastic material and defining the aperture therein. A first group of retaining members is integrally formed together with the frame body and extend into the aperture. A second group of retaining members is also integrally formed together with the frame body and extend into the aperture. The respective first and second groups of the retaining members abut opposed sides of the lens and have a dimension to permanently engage the lens in the aperture and between the first and second groups of retaining members.

In accordance with a further aspect of the present invention, there is a structural arrangement provided for attaching a substantially rigid lens to a frame of a pair of eye glasses which comprises a frame body made of a substantially rigid plastic material. A hollow space is defined in the lens and a portion of the substantially rigid frame body is filled into the hollow space of the lens during formation of the frame, thereby permanently engaging the lens with the frame.

The method and structural arrangement of the present invention provides a permanent attachment of lenses to the frames of eye glasses, which eliminates the possibility of losing lenses from the eye glasses.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1A:
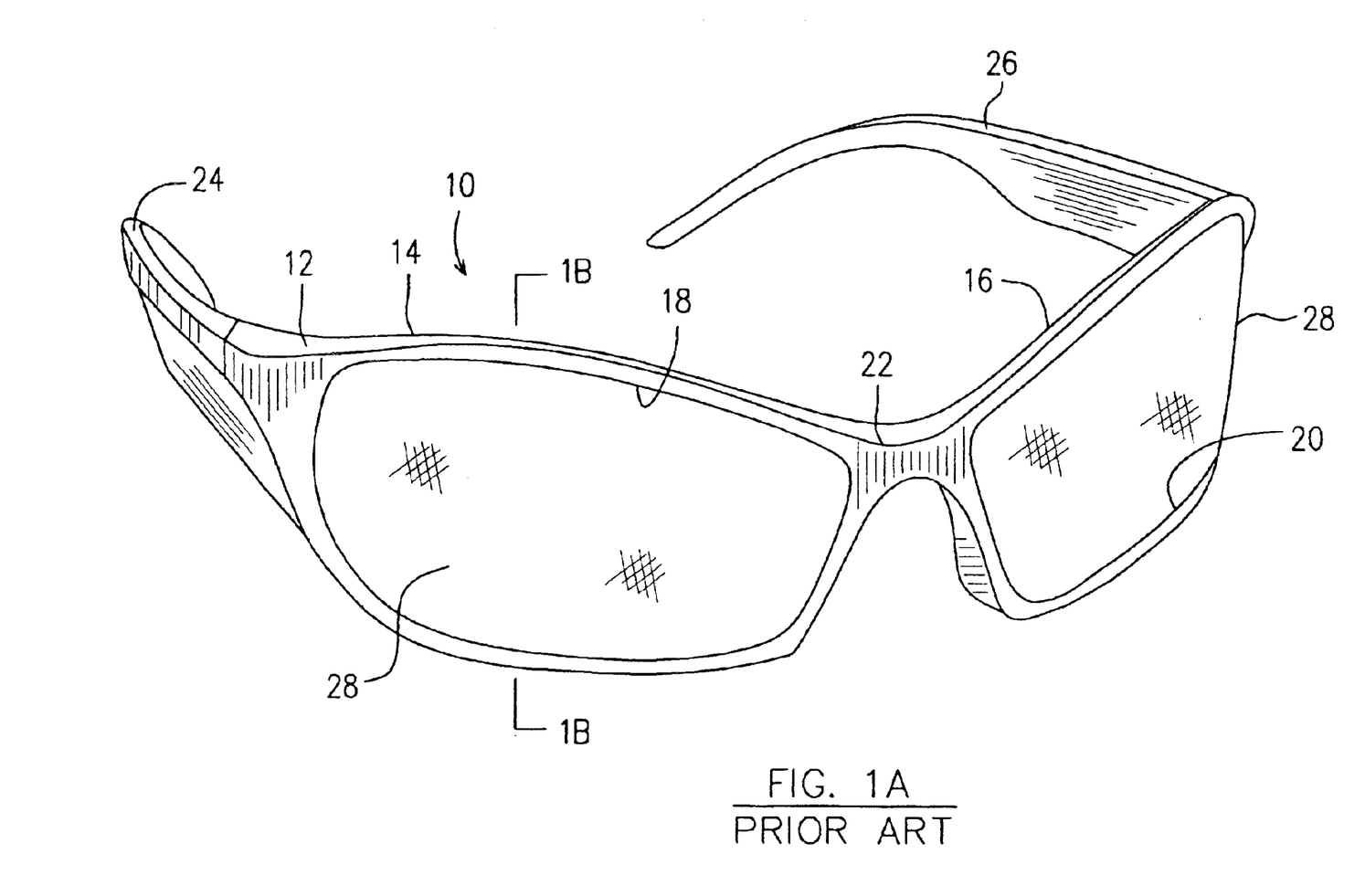
FIG. 1A is a perspective view of a pair of conventional eye glasses.
Figure 1B:
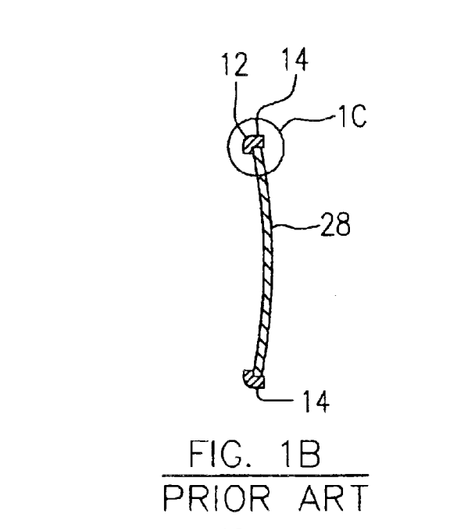
FIG. 1B is a cross-sectional view of the conventional eye glasses of FIG. 1A, taken along line 1B—1B, showing the conventional attachment of a lens to the frame structure.
Figure 1C:
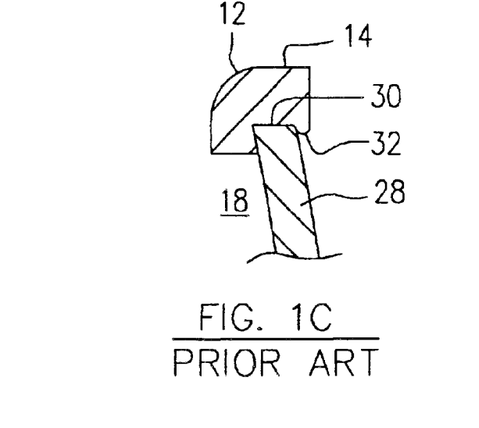
FIG. 1C is a partial cross-sectional view of the encircled area indicated as 1C in FIG. 1B, showing in greater detail the attachment of the lens to the frame structure.

FIGS. 1A–1C illustrate a pair of conventional eye glasses 10 which includes a frame structure 12 made of a substantially rigid plastic material. The frame structure 12 generally includes two frame bodies 14, 16 defining apertures 18, 20 therein, respectively. A bridge 22 interconnects the two frame bodies 14 and 16, and extends between the inner ends thereof. A pair of temples 24 and 26 made of the same substantially rigid material, are pivotally attached to one outer end of the respective frame bodies 14, 16. Each of the frame bodies 14, 16 of the frame 12, has a lens 28 affixed within the respective apertures 18, 20.

In order to secure the lens 28 to the respective frame bodies 14, 16, the inner periphery of the frame bodies 14, 16 which define the respective apertures 18, 20, includes a shallow circumferential recess 30. The lens 28 has a radial dimension to be snuggly fitted into the recess 30, thereby being frictionally retained within the respective apertures 18 and 20 of the frame 12. The circumferential recess 30 usually includes a front edge section 32 extending slightly radially inwardly for a better retention of the lens 28 within the frame structure 12. However, due to the substantially rigid property of the frame bodies 14, 16 and the lens 28 which is made of glass or substantially rigid transparent plastic, the inwardly extending front edge section 32 must be restrictively limited in dimension in order to allow for pressing the lens 28 into the respective apertures 18, 20 without damaging the lens 28 or the frame structure 12.

Figure 2A:
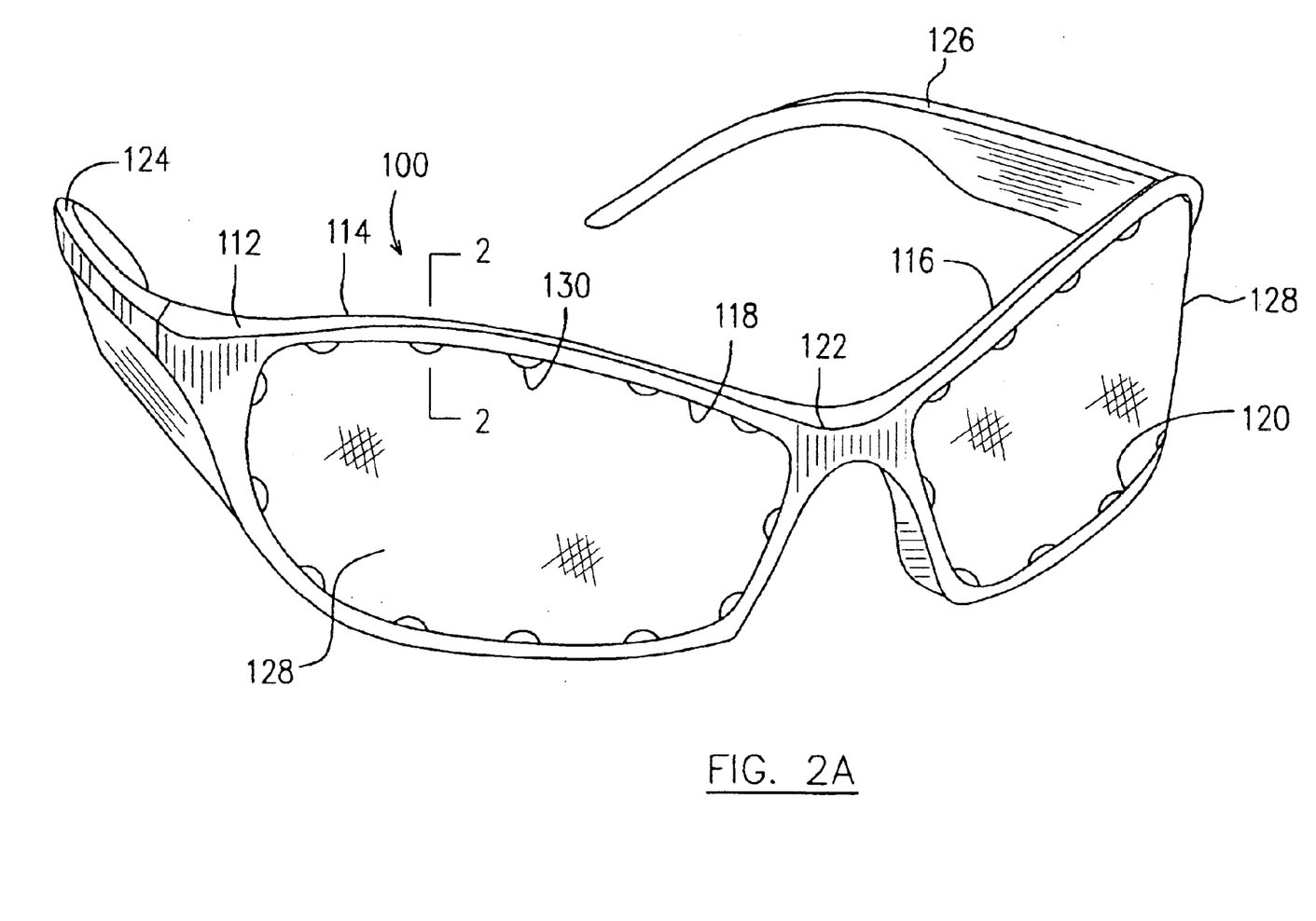
FIG. 2A is a perspective view of eye glasses configured for permanent attachment of lenses to the frame structure thereof in accordance with one embodiment of the present invention.
Figure 2B:
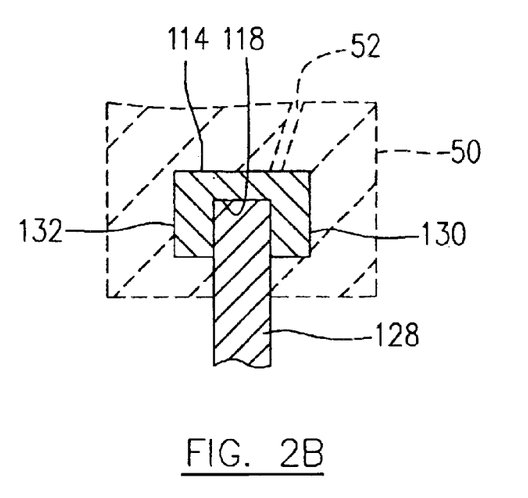
FIG. 2B is a cross-sectional view of the eye glasses of FIG. 2A, taken along 2—2 showing a structural arrangement of this embodiment.
Figure 2C:
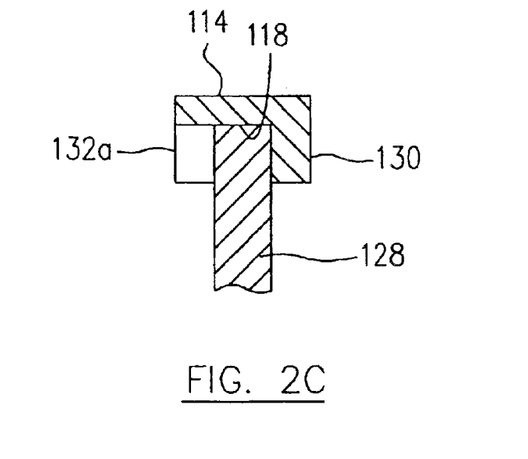
FIG. 2C is a partial cross-sectional view of the eye glasses of FIG. 2A, taken along line 2—2 showing an alternative structural arrangement thereof.

FIGS. 2A–2C illustrate a pair of eye glasses indicated by numeral 100 in accordance with a first embodiment of the present invention. The eye glasses 100 are used as an example to illustrate one embodiment of the present invention. Nevertheless, any other type of eye glasses which includes substantially rigid plastic frame bodies and substantially rigid lenses, such as prescription eye glasses, protective work glasses, sunglasses, etc. is included in the concept of the present invention as illustrated by the embodiment 100 and in further embodiments to be described hereinafter.

The eye glasses 100 include a frame structure 112 made of a substantially rigid plastic material. The frame structure 112 generally includes two frame bodies 114, 116, defining apertures 118, 120 therein, respectively. A bridge 122 interconnects the two frame bodies 114 and 116 and extends between the inner ends thereof. A pair of temples 124, 126 of the same substantially rigid plastic material are pivotally attached to an outer end of the respective frame bodies 114, 116. However, the temples 124, 126 may be made of metal or other rigid materials. Each of the frame bodies 114, 116 of the frame structure 112, has a lens 128 affixed within the respective apertures 118, 120. The frame structures 112 and the lenses 128 are thus far similar to the corresponding components of the conventional eye glasses 10 of FIG. 1A.

The difference between the conventional eye glasses 10 and the eye glasses 100 of the first embodiment of the present invention lies in that instead of pressing the lens 28 into each of the apertures 16, 18 of the eye glasses 10 of FIG. 1A, the lens 128 is attached to each of the apertures 118, 120 of the eye glasses 100 during the formation of the frame bodies 114, 116 such that the lens 128 is permanently attached to the frame structure 122 and cannot be removed therefrom or reattached by a conventional "click out" or "click in" action. The eye glasses 100 is symmetrical about its central axis (not shown) and the left and right halves are identical. Therefore, the description of a structural arrangement and method for this permanent attachment of the lenses to the eye glasses will be simplified by making reference to only one lens attachment to the one frame body of the eye glasses in this embodiment, and also in the description of other embodiments described hereinafter.

A first group of retaining members 130 integrally formed together with the frame body 114 extends into the aperture 118. A second group of retaining members 132 also integrally formed together with the frame body 114 extend into the aperture 118. The second group of retaining members 132 is spaced apart from the first group of the retaining members 130 and the first and second groups of the retaining members 130, 132 abut the respective opposed front and rear sides of the lens 128, thereby engaging a plurality of peripheral parts of the lens 128 therebetween. The number and size of the first and second groups of the retaining members 130, 132 may be identical and may be disposed to correspond one with another in the circumferential direction of the aperture 118, as shown in FIG. 2B, but this is optional rather than necessary. The first and second groups of the retaining members 130, 132 must have a dimension thereof which is much greater than the total allowed maximum elastic deformation of the lens 128 and the frame body 114, in order to prevent disengagement of the lens 128 from the first and second groups of retaining members 130, 132, thereby ensuring the permanent attachment of the lens 128 within the aperture 118. In FIG. 2B, a molding device 50 is indicated with a broken line representing a partial section thereof. The molding device 50 defines a cavity (not indicated) in accordance with a configuration of the frame body 114 and the first and second groups of retaining members 130, 132, and includes a molding injection passage 52 communicating with this cavity in order to permit injection of the plastic material in an appropriate state into the cavity during a formation molding procedure.

The lens 128 is placed in a predetermined position with respect to the molding device 50 such that at least a portion of the molding device overlaps a portion of the lens 128 and the lens 128 closes major openings of the cavity of the molding device 50 except for the molding injection passage 52 and air escape passages (not shown). When the lens 128 is placed and held by tools (not shown) in this predetermined position and closes the major openings of the cavity of the molding device 50, the formation molding procedure begins and the cavity is filled with the plastic material, thereby forming the substantially rigid plastic eye glasses frame which defines the aperture 118 therein, with permanent attachment of the lens thereto.

In this embodiment, the frame bodies 114, 116 and the bridges 122 are integrally formed in one molding procedure. Therefore, a pair of the lenses 128 are placed in a first and second predetermined positions with respect to the molding device 50 such that a portion of the molding device overlaps a portion of each of the lenses 128. The permanent attachment of the pair of lenses 128 is achieved simultaneously with the formation of the frame bodies 114, 116 and the bridge 122. The plastic molding procedure to fabricate the required configuration is well known in the art. In the present invention, the lenses are placed in the predetermined first and second positions, and therefore, the molding device in combination with the lenses, define the configuration of the plastic frame to be molded, and as a result the lenses are permanently engaged with the plastic frame during the formation of the frame.

FIG. 2C illustrates an alternative structural arrangement of the embodiment shown in FIG. 2A. In this alternative structural arrangement, the second group of retaining members which are indicated by 132a to be distinguished from the second group of retaining members 132 of FIG. 2B, are positioned to be not aligned with the first group of retaining members 130, respectively. The first and second groups of the retaining members 130, 132a are offset in the circumferential direction, which does not affect the permanent engagement of the lens 128 within the frame body 114, provided that the dimension of the first and second groups of retaining members 130, 132a of the structural arrangement of FIG. 2C is not smaller than the dimension of the first and second groups of the retaining members 130, 132 of the structural arrangement of FIG. 2B.

Figure 3A:
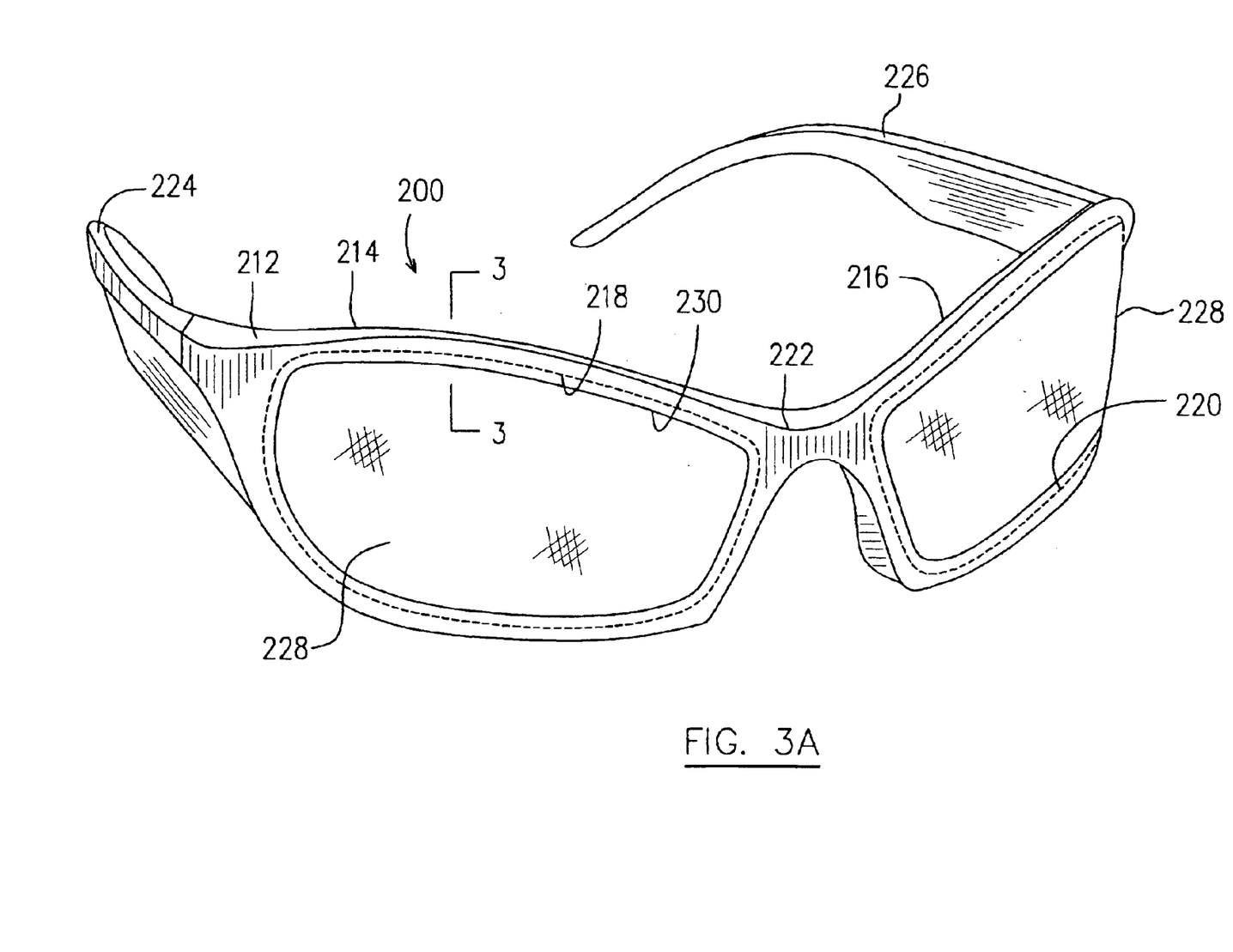
FIG. 3A is a perspective view of eye glasses configured for permanent attachment of lenses to the frame structure thereof according to a second embodiment of the present invention.
Figure 3B:
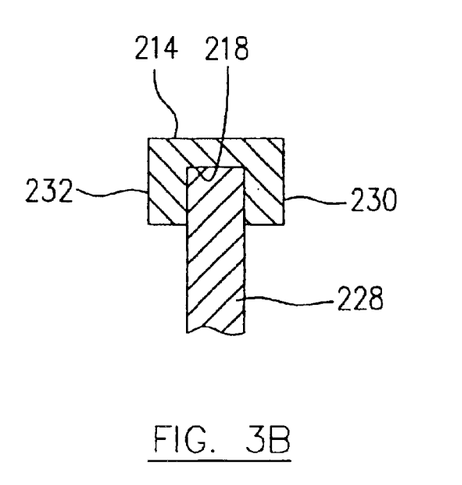
FIG. 3B is a partial cross-sectional view of the eye glasses of FIG. 3A, taken along line 3—3, showing a structural arrangement thereof.
Figure 3C:
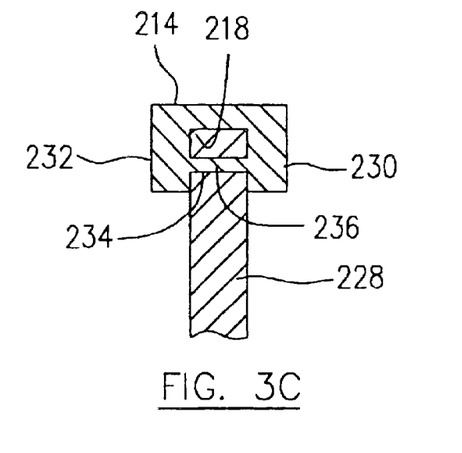
FIG. 3C is a partial cross-sectional view of the eye glasses of FIG. 3A, taken along line 3—3, showing an alternative structural arrangement thereof.

FIGS. 3A–3C illustrate a second embodiment of the present invention in which a pair of eye glasses 200 is similar to the pair of eye glasses 100 of FIG. 2A. The components of eye glasses 200 are indicated using numerals in the 200 series with the last two digits corresponding to similar components in the 100 series illustrated in FIG. 2A, and will not therefore be redundantly described. The embodiment shown in FIG. 3A is a further development of the embodiment shown in FIG. 2A. When the retaining members 130 and 132 of the eye glasses 100 (as shown in FIGS. 2A and 2B), are connected adjacent to one another in each of the first and second groups, these retaining members substantially form opposed continuous side walls 230, 232 extending into the aperture 218 of the eye glasses 200, thereby defining a continuous channel therebetween (not indicated). The continuous channel defined between the opposed side walls 230, 232 is configured to correspond to the periphery of the lens 228 for receiving the periphery of the lens 228, and has a depth which is much greater than the amount of total maximum elastic deformation of the lens 228 and the frame body 214, in order to permanently engage the lens 228 when the attachment of the lens to the aperture 218 is completed during the formation of the frame body 214.

The formation of the frame body 214 is completed simultaneously with the formation of the frame body 216 and the bridge 222 in a molding process using a molding device (not shown) similar to the molding device 50 of FIG. 2B with a cavity defined therein corresponding to the configuration of the frame structure 212, and particularly to the configuration of the opposed continuous side walls 230, 232. The lenses 228 are placed in first and second positions respectively, with respect to the molding device. A continuous portion of the molding device overlaps a continuous periphery portion of each of the lenses 228 at both sides thereof (the cross-section will be similar to that illustrated in FIG. 2B) such that each of the frame bodies 214, 216 is formed with the opposed continuous walls 230, 232 extending therefrom into each of the apertures 218, 220.

It should be noted that in this embodiment and other embodiments to be further described, the molding devices are similar to the molding device 50 with different cavities defined therein. In order to more clearly illustrate the structural features of each embodiment of the present invention and avoid confusion, the other molding devices will not be shown and the description of the corresponding formation molding procedures will be referred to the molding device 50 of FIG. 2B.

FIG. 3C illustrates an alternative structural arrangement for the permanent attachment of the lens 228 to the aperture 218 of the eye glasses 200. In this alternative structural arrangement, the lens 228 is provided with a hollow space therein, for example, a plurality of holes 234 extending through a periphery portion of the lens 228. During the molding procedure of the frame bodies 214, 216 and the bridge 222, the peripheral portion of the lens defining the holes 234 therein, overlaps a portion of a molding device similar to the molding device 50 of FIG. 23 such that a portion of the frame body 214 is filled into the hollow space of the lens 228, thereby forming a plurality of studs 236 integrated with the frame body 214 and extending through the holes 234. The holes 234 are spaced apart from one another along the periphery of the lens 228, and thus the studs 236 extending therethrough reinforce the permanent attachment of the lens 228 to the aperture 218 defined in the frame body 214.

The attachment of the lenses to the apertures of the frame structure of eye glasses according to the present invention is achieved by permanent engagement resulting from specific structural arrangements between the lenses and the frame bodies, rather than frictional forces therebetween resulting from elastic deformation of both lenses and frame bodies as in the prior art. Thus, the attachment of the lenses to the frame structure according to the present invention is much more secure and completely eliminates the risk of losing the lenses. Furthermore, the structural arrangement for the permanent engagement of lenses according to the present invention requires less accurate peripheral geometry of the lenses because the attachment of the lenses to the aperture of the frame bodies is achieved during the formation of the frame bodies, which results in an automatic match between the periphery of the lens and the inner periphery of the frame body defining the aperture.

Figure 4A:
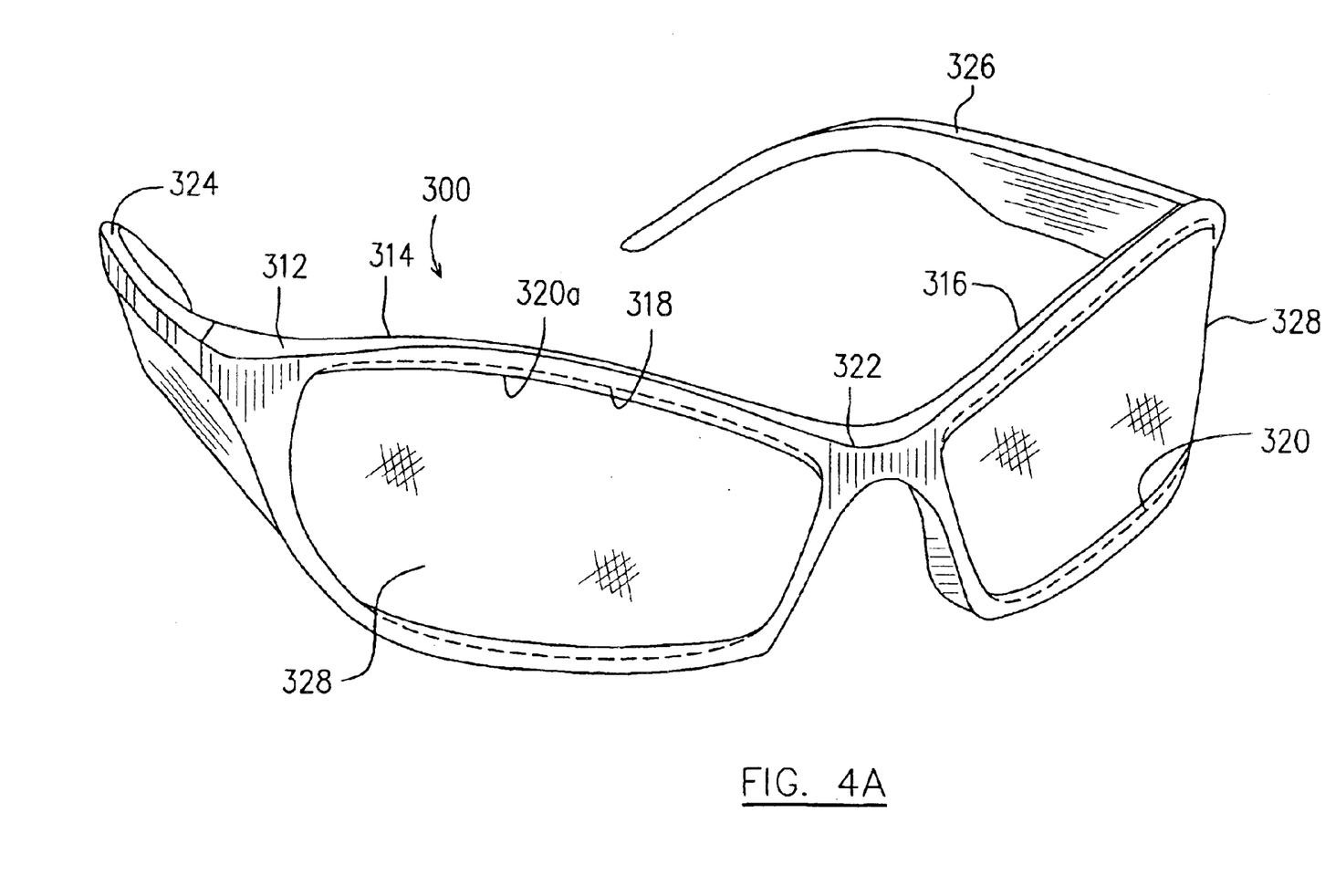
FIG. 4A is a perspective view of eye glasses configured for permanent attachment of the lenses to the frame structure thereof in accordance with a third embodiment of the present invention.

FIG. 4A illustrates a third embodiment of the present invention in which a pair of eye glasses 300 having components similar to those of the eye glasses 200 illustrated in FIG. 3A. The similar components of eye glasses 300 are indicated by numerals in the 300 series with the last two digits similar to those indicating corresponding components of the eye glasses 200 in FIG. 3A, and will not therefore be redundantly described. The difference between the eye glasses 300 and the eye glasses 200 of FIG. 3A lies in that, instead of having opposed continuous side walls 230, 232 of FIG. 33 defining a continuous channel surrounding the entire periphery of lens 228, the frame body 314 of eye glasses 300 includes an upper section of a channel defined between an upper front side wall 320a and an upper rear side wall (behind the lens 328 and not shown) and a lower channel defined between a lower front side wall 320b and a lower rear side wall (behind the lens 328 and not shown). An upper section of the lens 328 is received within the upper section of the channel and is restrained between the upper front and upper rear side walls while a lower section of the lens 328 is received within the lower section channel and is restrained between the lower front and lower rear side walls. It is understood that the upper and lower section channels have a depth appropriate for the permanent engagement of the lens 328 therein. Optionally, holes (not shown) can be defined in the peripheries of the upper section and the lower section of the lenses 328 in order to allow the formation of studs extending therethough, as illustrated in FIG. 3C, thereby reinforcing the permanent attachment of the lens 328 to the frame body 314.

Figure 5A:
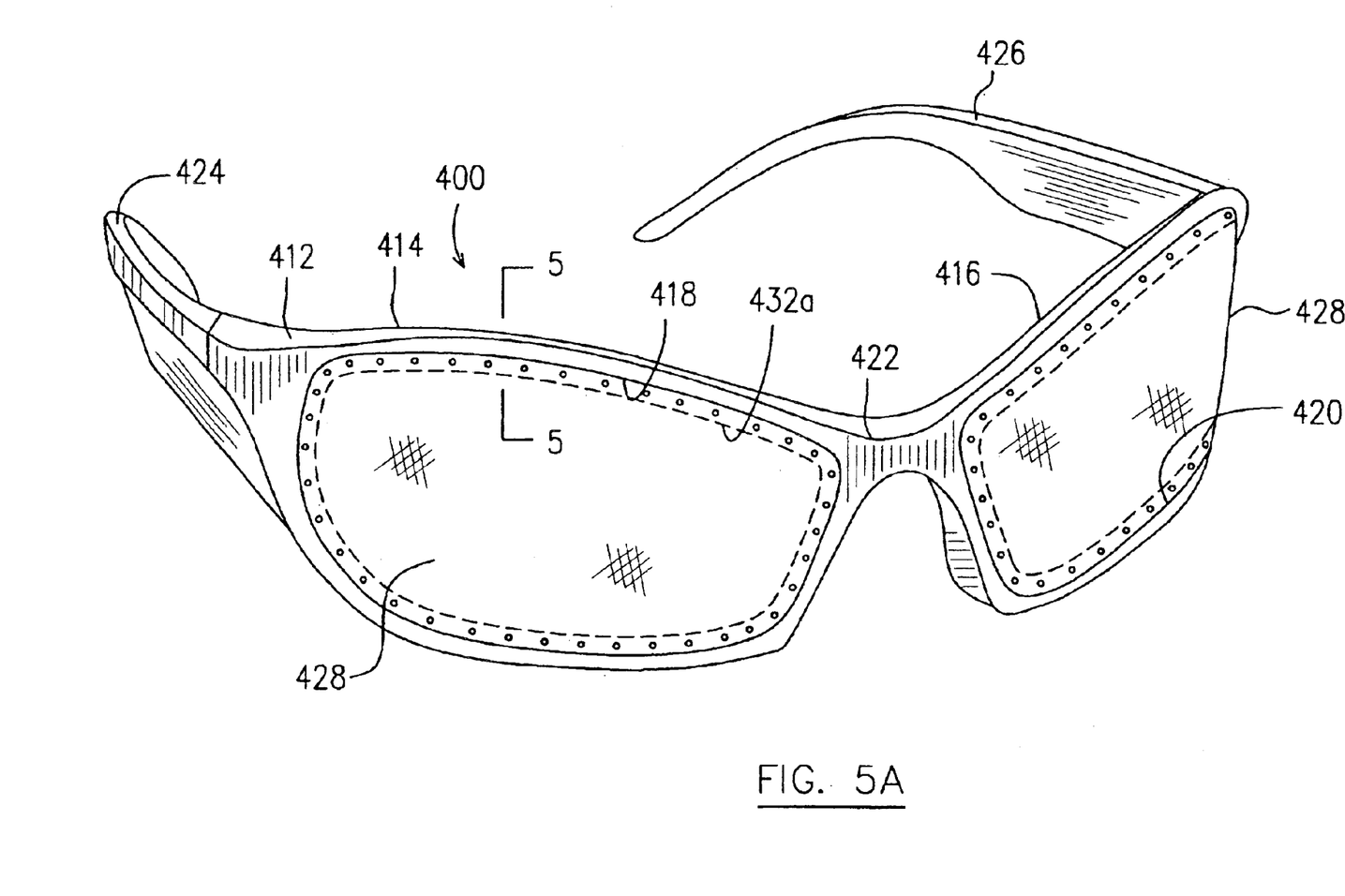
FIG. 5A is a perspective view of eye glasses configured for permanent attachment of the lenses to the frame structure thereof in accordance with a fourth embodiment of the present invention.
Figure 5B:
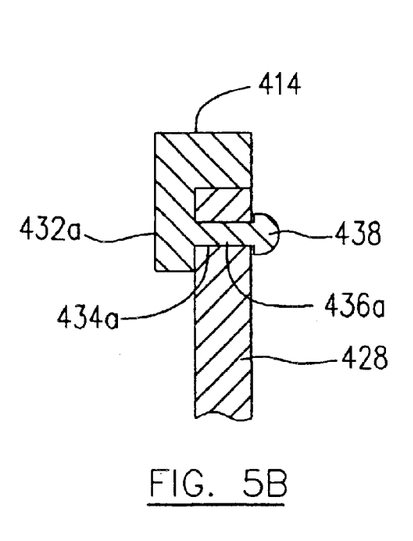
FIG. 5B is a partial cross-sectional view of the eye glasses of FIG. 5A, showing an structural arrangement thereof.

FIGS. 5A–5B illustrate a fourth embodiment of the present invention generally indicated by numeral 400. The embodiment 400 is a pair of eye glasses including components similar to those of the eye glasses 100 shown in FIGS. 2A–2C. These similar components are indicated by numerals in the 400 series with the last two digits similar to those corresponding components of the eye glasses 100 of FIGS. 2A–2C, and will not therefore be redundantly described. Instead of having the plurality of retaining members 130, 132 of FIG. 2B, the eye glasses 400 includes a structural arrangement in which the lens 428 is provided with a hollow space defined as a plurality of holes 434a extending through the lens 428. The holes 434a are spaced apart one from another and are defined in a peripheral portion of the lens 428. The peripheral portion of the lens 428 defining the holes 434a therein abuts a continuous rear side wall 432a extending from the frame body 414 into the aperture 418 defined within the frame body 414. A plurality of studs 436a formed integrally with the frame body 414, are filled into the respective holes 434a. Furthermore, the studs 436a extend from the continuous rear side wall 432a through the respective holes 434a. Each stud 436a terminates at an enlarged end 438 thereof which has a size greater than the diameter of the stud. Thus the studs 436a permanently engage the lens 428 in the aperture 418 between the continuous rear side wall 432a and the enlarged end 43B of the studs 436a. This structural arrangement is also achieved during the formation of the frame body 414 in a molding procedure similar to that illustrated in FIG. 2B. An appropriate cavity configuration should be provided in the molding device in order to mold the frame body 414 such that when the lens 428 is placed in the predetermined position in which the lens 428 overlaps a portion of the molding tool and closes major openings of the cavity, the molding plastic material will fill the cavity, thereby forming the frame body 414 and the studs 436a with their enlarged ends 438 with the attachment of the lens 428 thereto. The molding procedure is similar to the molding procedure for the first embodiment described with reference to FIG. 2B.

In an alternative arrangement (not shown), the continuous side wall 432a can be disposed in the front of the eye glasses 400 such that the continuous rear side wall 432a becomes a continuous front side wall, and the plurality of enlarged ends 438 of the studs 436a are disposed behind the lens 428, resulting in the front view of the eye glasses 400 appearing similar to the eye glasses 200 illustrated in FIG. 3A.

FIGS. 6A–6E illustrate a fifth embodiment of the present invention in which a pair of eye glasses 500 generally includes components similar to those of the eye glasses 200 of FIG. 3A. Components of the eye glasses 500 are indicated by numerals in the 500 series with last two digits similar to the numerals indicating the similar components of the eye glasses 200 of FIG. 3A, and will not therefore be redundantly described. The difference between the eye glasses 500 and the eye glasses 200 of FIG. 3A is that a lower section of the frame bodies 514 and 516 is cut away and the apertures 518a, 520a defined within each of the frame bodies 514, 516 are incomplete in contrast to the complete apertures 218, 220 defined in each of the frame bodies 214, 216 of the eye glasses 200 of FIG. 3A. Therefore, a structural arrangement having opposed side walls defining a channel therebetween such as those defined in the eye glasses 200 and 300 of FIGS. 3A and 4A may not securely engage the lens 528 in the channel, depending on the size of the portion of the frame body 514 which is cut away and the geometry of the periphery of the lenses 528.

Figure 6A:
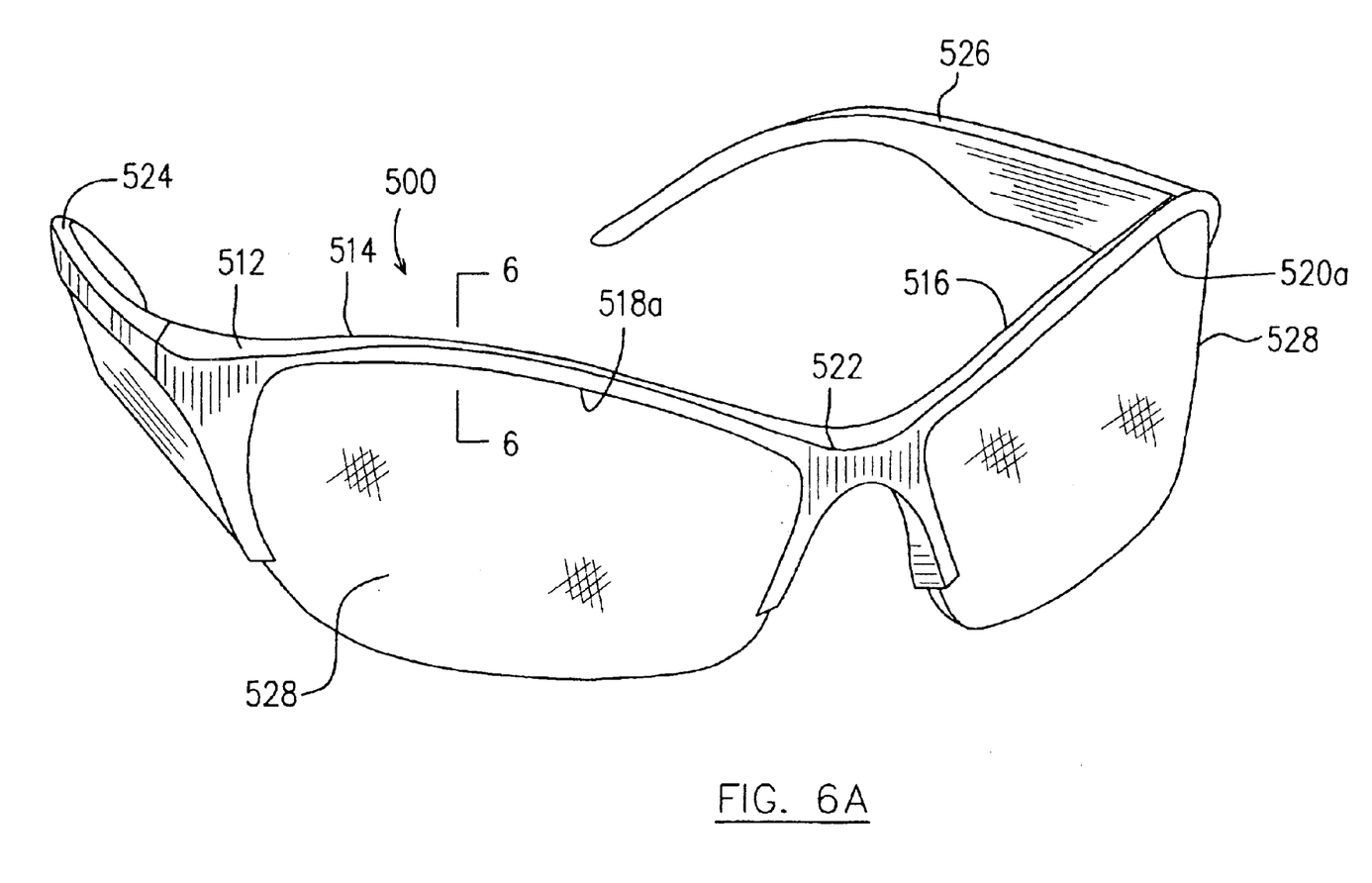
FIG. 6A is a perspective view of a pair of eye glasses configured for permanent attachment of the lenses to the frame structure thereof in accordance with a fifth embodiment of the present invention.
Figure 6B:
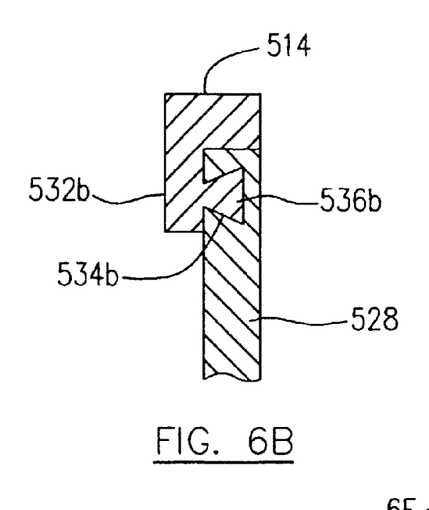
FIG. 6B is a partial cross-sectional view of the eye glasses of FIG. 6A, taken along line 6—6, showing a structural arrangement thereof.

In order to attach the lens 528 in the incomplete aperture 518a defined by the remaining portion of the frame body 514, the frame body 514 includes a rear side wall 532b extending into the incomplete aperture 518a and contacting an upper section of the peripheral portion on the rear side of the lens 528. A projecting member 536b is formed integrally with the rear side wall 532b and is filled into a hollow space defined in the upper section of the peripheral portion on the rear side of the lens 528. The hollow space defined in the lens 528 is a groove 534b extending along the upper section of the peripheral portion of the lens 528, preferably corresponding to the remaining portion of the frame body 514 defining the incomplete aperture 518a. The groove 534b includes opposed side walls 540, 542 and a bottom 544. A distance W1 defined between the opposed walls 540, 542 at the opening (not indicated) of the groove 534b must be smaller than a distance W2 defined between the opposed walls 540, 542 at the bottom 544 of the groove 534b. The projecting member 536b filled into the groove 534b during a formation molding procedure of the frame formation, is configured in accordance with the cross-section of the groove 534b, thereby permanently engaging the lens 528 in the incomplete aperture 518a defined in the remaining portion of the frame body 514.

Figure 6C:
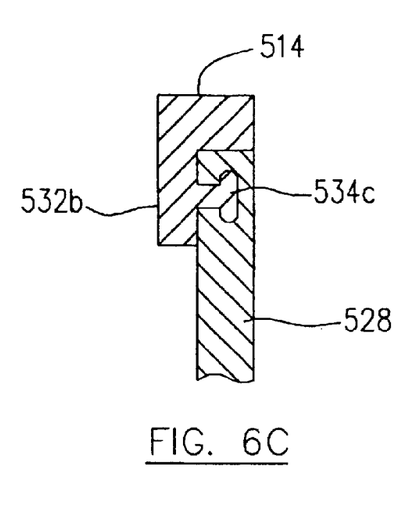
FIG. 6C is a partial cross-sectional view of the eye glasses of FIG. 6A taken along line 6—6, showing an alternative structural arrangement thereof.
Figure 6D:
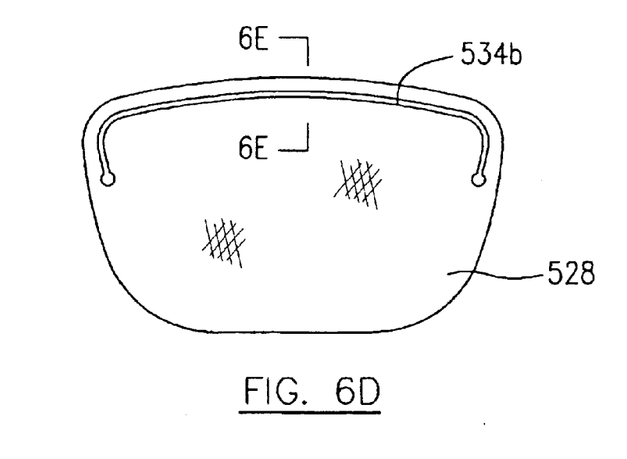
FIG. 6D is a rear elevational view of a lens of the eye glasses of FIG. 6A, showing a hollow space defined in the lens for the permanent attachment to the eye glasses frame structure.
Figure 6E:
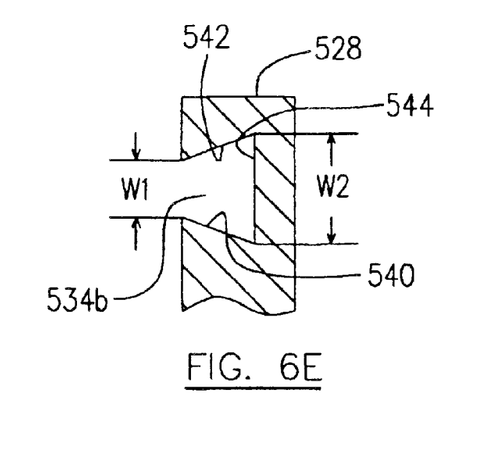
FIG. 6E is a partial cross-sectional view of the lens of FIG. 6D taken along line 6E—6E showing the detail of the hollow space defined therein.

The groove 534b can have any other cross-sectional configuration provided the distance W1 is smaller than distance W2. For example, a groove 534c having a T-shaped cross-sectional configuration is illustrated in FIG. 6C. In order to cut a groove such as 534b or 534c in the lens 528 having W1 smaller than W2, the opening size W1 may be enlarged at one or both ends of the groove 534b or 534c for entering and withdrawing a cutter, thereby forming an enlarged recess at one or both ends of the groove 534b or 534c as shown in FIG. 6D.

It should be understood that the rear side wall 532b can alternatively be disposed in the front of the frame structure 512 as a front side wall, and the hollow space such as the groove 534b would then be defined in the lens 528 on the front side thereof. Other structural arrangements as illustrated in FIG. 3C and FIG. 5B are also applicable to the eye glasses 500. Alternatively, the structural arrangements illustrated in FIGS. 6B and 6C are also applicable to eye glasses having complete apertures defined in the frame bodies, such as that shown in FIG. 5A.

The formation of the frame body 514 with attachment of lens 528 thereto is a molding procedure using a molding device similar to those described in other embodiments of the present invention, and will not be repeated herein.

The variety of structural arrangements of the present invention also advantageously provide a selection of styling options for eye glasses. For example, the embodiments illustrated in FIGS. 2A and 5A present novel styling features which cannot be achieved by conventional eye glasses.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

I claim:

1. A method for attaching a substantially rigid lens to a substantially rigid plastic eye glasses frame comprising:

providing a molding device for molding the substantially rigid plastic eye glasses frame;

placing the lens in a predetermined position with respect to the molding device, in the predetermined position a portion of the molding device overlapping a portion of the lens; and forming the substantially rigid plastic eye glasses frame with permanent engagement of the lens thereto using the molding device.

2. A method for attaching a pair of substantially rigid lenses to a pair of apertures of a substantially rigid plastic frame of a pair of eye glasses, comprising:

providing a molding device for molding the substantially rigid plastic frame;

placing the respective lenses in predetermined first and second positions with respect to the molding device in which positions a portion of the molding device overlaps a portion of each lens; and forming the substantially rigid plastic frame defining the pair of apertures in the respective first and second positions, with permanent attachment of each lens thereto using the molding device to process a plastic material in a formation molding procedure.

3. A method as claimed in claim 2 wherein a continuous portion of the molding device overlaps a continuous periphery portion of each lens at both sides thereof such that the substantially rigid plastic frame is formed with opposed continuous walls extending therefrom into each aperture, thereby forming a continuous channel configured to correspond to the periphery portion of one of the lenses, the continuous channel having a depth sufficient to permanently engage the annular periphery portion of each lens.

4. A method as claimed in claim 2 comprising a step of providing the pair of lenses, each lens defining a hollow space in the portion thereof which the portion of the molding device overlaps such that a portion of the plastic material is filled into the hollow space during the forming step of the substantially rigid frame.

5. A method as claimed in claim 4 wherein the hollow space in each lens is defined as a plurality of holes extending through the portion thereof which the portion of the molding device overlaps such that a plurality of studs formed together with the substantially rigid plastic frame in the forming step, extend through the individual holes in each lens to permanently engage each lens to the substantially rigid plastic frame.

6. A method as claimed in claim 4 wherein the hollow space in each lens is defined as a groove formed in the portion thereof which the portion of the molding device overlaps, a distance between opposed walls of the groove at an opening thereof being smaller than a distance between the opposed walls at a bottom of the groove such that a projecting member formed together with the substantially rigid plastic frame in the forming step, is filled into the groove in each lens to permanently engage each lens to the substantially rigid plastic frame.

7. A structural arrangement for attaching a substantially rigid lens to an aperture of a frame of a pair of eye glasses, comprising:

a frame body made of a substantially rigid plastic material and defining the aperture therein;

a first group of retaining members integrally formed together with the frame body, extending into the aperture;

a second group of retaining members integrally formed together with the frame body, extending into the aperture; and the respective first and second groups of the retaining members abutting opposed sides of the lens and having a dimension thereof to permanently engage the lens in the aperture and between the first and second groups of retaining members.

8. A structural arrangement as claimed in claim 7 wherein adjacent retaining members in the respective first and second groups are connected one to another to form opposed continuous side walls, thereby defining a continuous channel therebetween, the continuous channel being configured to correspond to a periphery of the lens for receiving the periphery of the lens, and having a depth sufficient to permanently engage the lens when the attachment of the lens is completed during formation of the frame.

9. A structural arrangement as claimed in claim 8 wherein the frame body comprises a plurality of studs disposed in the continuous channel, each stud extending between the opposed side walls of the channel and crossing the lens through a plurality of holes defined in the lens.

10. A structural arrangement for attaching a substantially rigid lens to a frame of a pair of eye glasses, comprising:

a frame body made of a substantially rigid plastic material;

a hollow space defined in the lens; and a portion of the substantially rigid frame body filled into the hollow space of the lens during formation of the frame, thereby permanently engaging the lens with the frame.

11. A structural arrangement as claimed in claim 10 wherein the frame body comprises a pair of apertures therein, the lenses being attached to the respective apertures of the frame body.

12. A structural arrangement as claimed in claim 11 wherein the hollow space is defined as a plurality of holes extending through the lens and wherein the portion of the substantially rigid frame body filled into the hollow space is defined as a plurality of studs integrated with the frame body and extending through the holes.

13. A structural arrangement as claimed in claim 12 wherein the frame body comprises opposed side walls extending into the aperture, thereby defining a channel therebetween, the channel receiving a portion of the lens therein, the portion of the lens including the holes defined in the lens, and the studs extending between the opposed side walls of the channel and crossing the lens through the holes.

14. A structural arrangement as claimed in claim 12 wherein each stud extends from the frame body through one of the holes in the lens, and includes an enlarged end having a size larger than a diameter of the hole in order to permanently engage the lens between the frame body and the enlarged end thereof.

15. A structural arrangement as claimed in claim 11 wherein the hollow space in the lens is defined as a groove formed in the lens at one side thereof, a distance between opposed walls of the groove at an opening thereof being smaller than a distance between the opposed walls at a bottom of the groove such that a projecting member formed together with the frame body during the formation of the frame body, is filled into the groove in the lens to permanently engage the lens to the frame.

* * * * *